Figure 5:
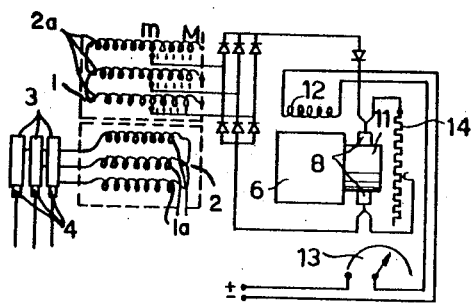

Nov. 27, 1962 G. SOGNI 3,066,250
ADJUSTABLE SPEED ELECTRIC MOTOR
Filed Dec. 19, 1957 2 Sheets-Sheet 1
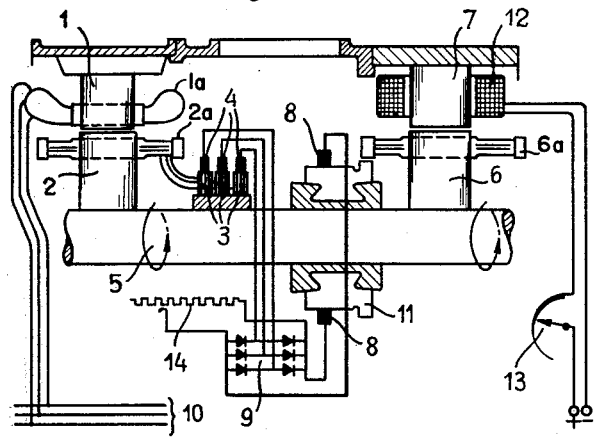
Fig. 1
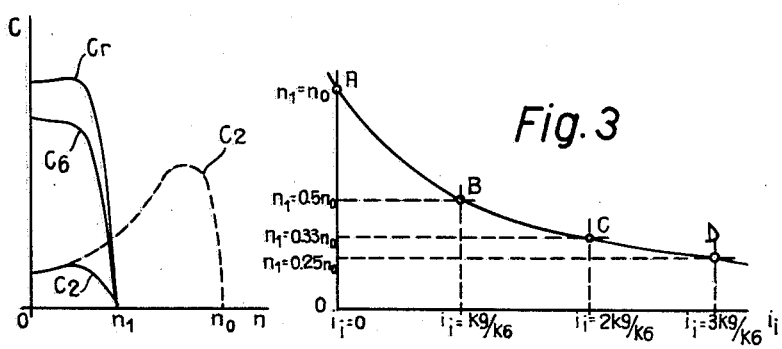
Fig. 2
Fig. 3
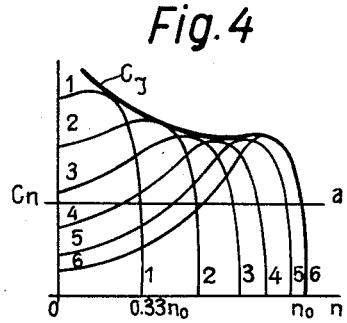
Fig. 4

Nov. 27, 1962 G. SOGNI 3,066,250
ADJUSTABLE SPEED ELECTRIC MOTOR
Filed Dec. 19, 1957 2 Sheets-Sheet 2

United States Patent Office 3,066,250
Patented Nov. 27, 1962

3,066,250
ADJUSTABLE SPEED ELECTRIC MOTOR
Giuseppe Sogni, Baranzate di Bollate, Italy
Filed Dec. 19, 1957, Ser. No. 703,967
Claims priority, application Italy Dec. 22, 1956
3 Claims. (Cl. 318—46)

This invention provides an adjustable speed electric motor adapted to be fed with a polyphase or monophase alternating current line having constant frequency and voltage.

The improved motor comprises an alternating current section including a stator and a rotor similar to those of induction rotary electric machines, adapted to rotate relatively to each other, the primary winding being fed with alternating current, the secondary winding feeding rectifiers, and a rectified current section including a stator and a rotor similar to those of direct current rotary electric machines adapted to rotate relatively to each other, the armature winding being fed through brushes bearing on its laminated commutator with the rectified current supplied by the above-mentioned rectifiers, the field winding being fed with direct or rectified excitation current which is varied in order to change the engine speed, the windings of both motor portions which are fed with current being stator or rotor windings, the rectifiers being stationary or rotating with the rotor.

Several embodiments of the invention shall be described hereafter with reference to the accompanying drawings. However, it will be understood that the description is not limited to this embodiment and that many changes may be made without departing from the scope and spirit of the invention. In the drawings:

FIGURE 1 is a partial longitudinal sectional view of an improved motor unit according to the invention, FIGURE 2 is a diagram showing the variation in torque delivered by the motor shown in FIG. 1 depending upon its number of revolutions, FIGURE 3 is a diagram showing the speed change on idle running of the motor shown in FIG. 1 depending upon the excitation current in the field winding of the machine fed by the rectified current.

FIGURE 4 is a diagram showing the family of torque-revolution characteristics at various current magnitudes, FIGURE 5 diagrammatically shows a modified embodiment of the improved motor unit shown in FIGURE 1 in which the primary and secondary windings of the alternating current section have been transposed.

Figure 6:
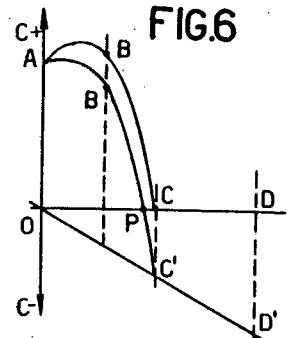
Figure 7:
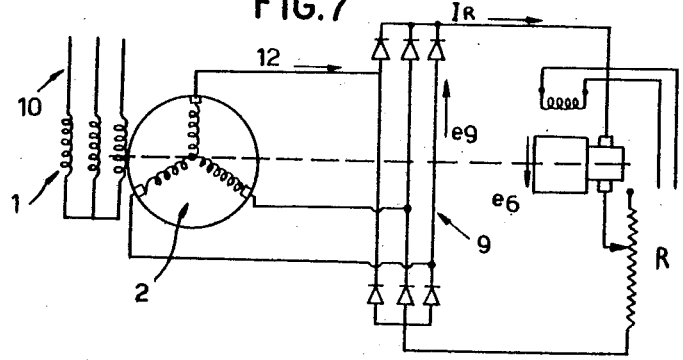
Figure 8:
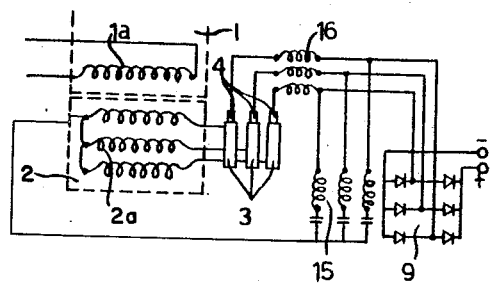

FIGURE 6 is a diagram showing the variation in driving torque and braking torque depending upon the number of revolutions, obtainable through the use of the unit shown in FIGURE 5, FIGURE 7 is a partial diagrammatical sketch of some elements shown in FIGURE 5 to illustrate the connection of a resistor according to a modified construction, FIGURE 8 is a partial diagrammatical sketch of FIG. 5 showing details of the motor unit according to a further modified embodiment in which the improved motor unit can be fed from a monophase line.

In the embodiment shown in FIG. 1 the motor comprises a three-phase current section including a stator 1 having a primary winding 1a wound thereon similar to the stator of a conventional three-phase asynchronous converter having P pole pairs and a rotor 2 having a secondary winding 2a wound thereon similar to a rotor of a conventional three-phase asynchronous converter. In FIGURE 1 the stator and the rotor are assumed to be stationary and rotate, respectively. The primary winding 1a is fed from the three-phase line 10, the secondary winding 2a leading to the three rings 3 on which the current delivery brushes 4 bear.

The motor shaft 5 associated with said three-phase current motor portion has keyed thereto a commutator 11 and a rotor 6 similar to a rotor on a conventional direct current machine having Q pole pairs. The armature winding 6a which together with the field winding 12 of the stator 7 having Q pole pairs forms the rectified current operated motor section, and is fed through stationary brushes 8 and rectifier 9 from the secondary winding of the alternating current operated motor section. The field winding 12 is fed with direct or rectified current through the rheostat 13.

It will be seen that when the rotor is at standstill the alternating current section is equivalent to a short-circuited dispersion transformer. The current in the secondary winding 2a is rectified by the rectifier 9 and fed to the armature winding 6a generating in the latter a driving torque by effect of the flux set up by the field winding 12 traversed by the excitation current. Said torque can be added to the torque set up on the motor shaft 5 by the alternating current section.

On rotation of the shaft 5 at a speed such that the electromotive force set up in the armature winding 6a equals the voltage across the rectifier 9 on the rectified current side, the alternating and rectified secondary currents, hence the torques are annulled.

FIGURE 2 gives a qualitative showing of the behaviour of the torque $C_r$ supplied by the motor just described depending upon the revolutions of the motor as a percentage of synchronous turns. It will be seen that said torque is the sum of torques $C_2$ and $C_6$ generated in the armatures 2 and 6, FIGURE 1. It will be seen moreover that, if the electromotive force set up in the armature winding 6a equals the voltage on the rectified current side appearing in the rectifier 9 at a speed of the armature 2 which is $n_1=(1-s)n_0$ ranging between zero speed and synchronism speed $n_0=60f:P$, at such speed $n_1$ the torque $C_r$ becomes nil and remains such over the full speed range between $n_1$ and $n_0$ as well as at speed exceeding $n_0$.

At a given value of the excitation current $i_1$ in the field winding 12 the electromotive force $e_6$ which is set up in the armature winding 6a can be expressed by the formula $e_6=k_6 i_1 n_1$, that is, $e_6=k_6 i_1(1-s)n_0$, while the rectified electromotive force $e_9$ appearing between the polarities + and − of the rectifier 9 connected with the secondary winding 2a can be expressed by the formula $e_9=k_9 s n_0$. The speed at which the torque $C_r$ is annulled being the speed at which $e_6$ and $e_9$ equal each other, can therefore be obtained from the expression $k_6 i_1(1-s)n_0=k_9 s n_a$, from which I readily obtain $s=k_6 i_1:(k_6 i_1+k_9)$; therefore, recalling the assumption $n_1=(1-s)n_0$, the speed on idle running is $n_1=k_9:(k_9+k_6 i_1)n_0$. From the latter expression it is clear that the speed on idle running of the motor can be adjusted by acting on the excitation current $i_1$ of the field winding 12, said speed being lowest at the maximum value of $i_1$, while with $i_1=0$ it coincides with the synchronism speed $n_0$.

The curve ABCD in FIGURE 3 shows the speeds on idle running depending upon the excitation current $i_1$. Calculation shows that, in order to adjust idle running motor speed for instance to a three to one ratio, which comes to a maximum value as $i_1$ equalling $2k_9:k_6$ it will be sufficient to make the rectified current motor section about of the same size, that is, of the same weight of the alternating current section. This ratio of highest to lowest speed obviously applies to running under load as well. The motor torque with the rotor at standstill is in any case a fairly powerful one, which makes the motor more particularly suitable for use for lifting and traction purposes.

FIGURE 4 shows the family of torque-revolution characteristics obtainable for the motor fed with increasing voltage and frequency at various constant values of the excitation current $i_1$, and their envelope $C_1$ drawn by a thicker line. The line *a* on the ordinate $C_n$ shows the normal torque of a utilizer in which torque is constant with speed, such as a lifting apparatus.

When it is desired to further widen the speed adjusting range without enlarging the size of the rectified current portion, it will obviously be necessary to make the electromotive force $e_9$ smaller, that is, increase the conversion ratio of the inductor voltage to the armature voltage in the alternating current motor portion. This can be effected, for instance, if the primary winding $1a$ fed with current is a three-phase delta connected winding by going over to a star connection and, if the winding fed with current is a three-phase star connected winding by going over to a delta connection, finally by providing the secondary and/or the primary winding with auxiliary taps having variable numbers of turns according to the procedure employed for transformers.

When it is desired to simultaneously lower the idle running speed and the motor torque at standstill, the structure shown in FIGURE 5 is adopted in which the three-phase current is fed into the rotor winding which becomes the primary winding $1a$, with the stator winding becoming the secondary winding $2a$. The secondary winding $2a$ is provided with adjustable taps by means of which the number of turns of the secondary winding $2a$ is increased from the minimum number $m$ to the maximum number $M$, leaving the connection of the primary winding $1a$ unaltered to so lower the idle running speed and the motor torque at standstill. The electromotive force is indirectly proportional to the number of turns connected in the secondary winding and are proportional to the slip, such ratio applying, other conditions being the same, also to the idle running speeds of the motor. Further variations are effected by varying the resistance of the rheostat 13.

Motors are frequently required which yield in addition to a driving torque a braking torque. For the direct current machine to supply a reverse torque, excitation and direction of rotation being unaltered, said machine should be converted from a motor to a generator. The direction of current through the rotor should therefore be reversed. However, this is prevented by the provision of the rectifier. In the improved motor the braking torque (FIGURES 1 and 5) is obtained by shunting on the brushes 8 of the commutator 11 a resistor 14 to provide a path for the reversed armature winding current, the resistor 14 is traversed by said current which is proportional to the electromotive force of the armature winding $6a$, hence to its speed, field excitation current, $i_1$ being constant, and sets up on the rotor 6 a braking torque shown (FIGURE 6) by the straight line OD'. In the absence of such resistor the motor torque is shown by the line ABCD, and therefore never brakes. The alternating current machine runs idle, that is, its primary current is annulled, whereas the direct current machine further operates as a generator feeding the resistor connected in parallel with the rectifier.

With the provision of the abovementioned resistor the torque is shown by the line AB'PC'D'. The difference between the ordinates C and C' on the two curves of FIG. 6 indicates the braking torque. It will be seen that at all speeds when the abscissa is less than OP, the torque from the motor shaft is a driving torque, while when the abscissa is greater than OP, that is throughout the portion PC'D', and beyond the torque from the motor shaft is a braking torque, the mechanical power converted by the motor to electrical power being dissipated in the resistor 14 (FIG. 5). In order to obtain from the motor a reduction in torque with the operational speed remaining the same, and with the cyclic direction of the alternating current section remaining unaltered the rectified current section should be excited by a current having an excitation $i_1$ such that the electromotive force $e_6$ at the stationary brushes 8 is added to the electromotive force $e_9$ across the rectifier on the rectified current portion.

In order to comply with this requirement (FIGURE 7) the resistor 17 is connected between the brushes on the commutator 11 and rectifier 9. Assuming R to be the ohmic value of the resistor 17 and $I_R$ the current traversing the circuit 9, 17, 11, the result is $RI_R = e_6 + e_9$. Since $e_9$ should always be positive, $RI_R$ should be greater than $e_6$, hence $I_R$ should be greater than $e_6:R$. Since $I_R$ is nothing but the rectified current $I_2$ and $e_6$ depends upon the motor speed and excitation current $i_1$, the ohmic value R of the resistor 17 can easily be determined in the various cases. Consequently, upon determining the $RI_R$ value, the voltage $e_9$ across the rectifier 9 on the rectified current side can be determined, bearing in mind that $e_9 = RI_R - e_6$.

Where the improved motor is fed from a single phase line such as might prove convenient for traction purposes, a polyphase secondary winding being however maintained, it yields on account of the reverse rotating field provided in such case induced electromotive forces which, on flowing through the secondary winding at standstill, at the synchronism speed, instead of annulling each other as with polyphase current feed, said electromotive forces are doubled in width and frequency. Such electromotive forces should not reach the rectifier except a small fraction thereof, which can be obtained, for instance, by shunting (FIGURE 8) on the secondary winding $2a$ capacitive reactances 15 which at a certain rotor speed, hence a certain frequency of the electromotive forces of the reverse field, sink to a sufficiently low value, and interposing if desired inductive reactances 16, the value of which is summed up with the value proper of the secondary winding $2a$.

Finally, it should be noted that for use both for traction and other purposes subject to limitations in size the alternating current section and rectified current section of the motor could be arranged with their rotors keyed to two distinct shafts, thereby giving rise to two distinct motors, each supplying to its shaft its respective torque. Such shafts could be mechanically interconnected or independent of each other. A certain mechanical connection would, however, arise in use for traction from adherence of the driving wheels to the track.

What I claim is:

1. Adjustable speed electric motor comprising an alternating current section and a rectified current section, said alternating current section including a first stator and a first rotor similar to those of electric induction machines, a primary winding in said first stator fed with alternating current, a secondary winding in said first rotor and a rectifier unit fed from said secondary winding, said rectified current section including a second stator and a second rotor similar to those of direct current rotary electric machines, an armature winding in said second rotor and a field winding in said second stator, a laminated commutator associated with said second rotor, brushes bearing on said commutator for feeding the armature winding in said second rotor with the rectified current from said rectifier unit, and a variable resistor connected by its ends to said brushes bearing on the said commutator for feeding the armature winding in said rotor.

2. Adjustable speed electric motor comprising an alternating current section and a rectified current section, said alternating current section including a first stator and a first rotor similar to those of electric induction machines, a primary winding in said first rotor fed with alternating current, a secondary winding in said first stator and a rectifier unit fed from said secondary winding, said rectified current section including a second stator and a second rotor, similar to those of direct current rotary electric machines, an armature winding in said second rotor and a field winding in said second stator, a laminated commutator associated with said second rotor, brushes bearing on said commutator for feeding the armature winding in said second rotor with the rectified current from said rectifier unit, and a variable resistor connected by its ends to said brushes bearing on the said commutator for feeding the armature winding in said rotor.

3. Adjustable speed electric motor comprising an alternating current section and a rectified current section, said alternating current section including a first stator and a first rotor similar to those of electric induction machines, a winding in said first stator and a winding in said first rotor, one of said windings being fed with alternating current, a rectifier unit fed from the other of said windings, said rectified current section including a second stator and a second rotor similar to those of direct current rotary electric machines, an armature winding in said second rotor, a field winding in said second stator, a laminated commutator associated with said second rotor, brushes bearing on said commutator for feeding the armature winding in said second rotor, and a resistor connected by its ends directly to the said brushes.

References Cited in the file of this patent

UNITED STATES PATENTS

| | | |
|---|---|---|
| 2,066,508 | Young | Jan. 5, 1937 |
| 2,288,338 | Willis | June 30, 1942 |
| 2,319,625 | Ostrander | May 18, 1943 |
| 2,359,145 | Myers et al. | Sept. 26, 1944 |